United States Patent [19]

Johansson

[11] Patent Number: 4,560,595
[45] Date of Patent: Dec. 24, 1985

[54] THERMAL/OPTICAL CAMOUFLAGE WITH CONTROLLED HEAT EMISSION

[75] Inventor: Lars E. Johansson, Ottawa, Canada

[73] Assignee: Diab-Barracuda AB, Laholm, Sweden

[21] Appl. No.: 592,237

[22] Filed: Mar. 22, 1984

[30] Foreign Application Priority Data

Mar. 25, 1983 [SE] Sweden .................. 8301666

[51] Int. Cl.⁴ .................................................. F41H 3/00
[52] U.S. Cl. ....................................... 428/17; 156/61; 156/268; 428/461; 428/919
[58] Field of Search ................. 428/919, 461, 17; 156/61, 268

[56] References Cited

U.S. PATENT DOCUMENTS

| | | | |
|---|---|---|---|
| 3,069,796 | 12/1962 | Ruter | 428/919 X |
| 3,481,812 | 12/1969 | Holub et al. | 428/461 X |
| 3,655,502 | 4/1972 | Yoshikawa | 428/152 X |
| 3,733,606 | 5/1973 | Johansson | 428/919 X |
| 4,308,882 | 1/1982 | Pusch et al. | 428/919 X |
| 4,323,605 | 4/1982 | Rush | 428/919 X |
| 4,340,634 | 7/1982 | Pusch et al. | 428/134 |
| 4,375,488 | 3/1983 | Hogan | 428/919 X |
| 4,433,025 | 2/1984 | Pusch et al. | 428/209 X |
| 4,464,418 | 8/1984 | Pusch et al. | 428/155 X |
| 4,465,731 | 8/1984 | Pusch et al. | 428/919 X |
| 4,467,005 | 8/1984 | Pusch et al. | 428/919 X |
| 4,493,863 | 1/1985 | Karlsson | 428/919 X |
| 4,529,633 | 7/1985 | Karlsson | 428/17 |

FOREIGN PATENT DOCUMENTS

| | | | |
|---|---|---|---|
| 1187525 | 2/1965 | Fed. Rep. of Germany | 428/919 |
| 1605131 | 12/1981 | United Kingdom | 428/919 X |
| 1605187 | 3/1983 | United Kingdom | 428/919 X |

*Primary Examiner*—Henry F. Epstein
*Attorney, Agent, or Firm*—Lee, Smith & Zickert

[57] ABSTRACT

The thermal emission characteristics of sheet form camouflage material is predetermined to match closely the known thermal emission characteristics of the natural environment in which the particular camouflage material is intended to be used. This control is accomplished by the combination of a reflecting thin metallic layer covered on at least the exposed side by a layer of plastic material comprising at least two different plastic materials each having different emissivity properties. The reflecting layer both minimizes the heating of the camouflage material from sources covered by the material and reflects incident heat from meteorological sources such as solar warming and the plastic layer controls and determines the radiation of heat from all parts of the exposed surface of the camouflage to present to surveillance equipment a thermal-picture closely simulating that of the surrounding terrain.

19 Claims, 17 Drawing Figures

FIG. 1
FIG. 2
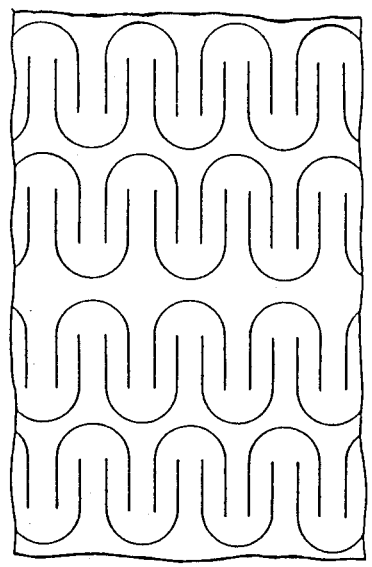
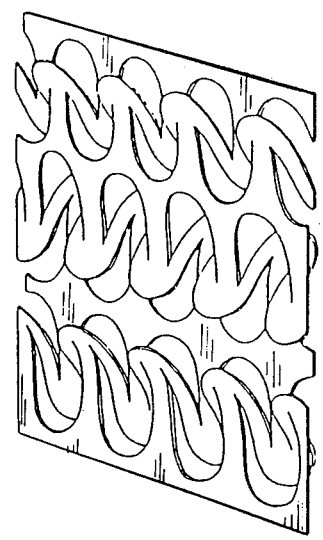
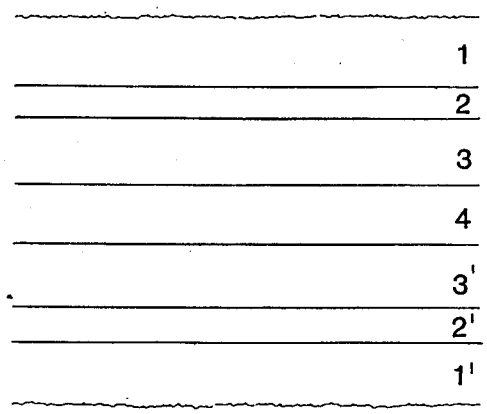
FIG. 3
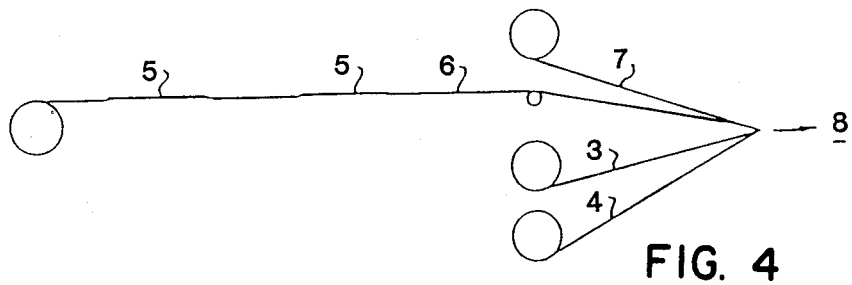
FIG. 4

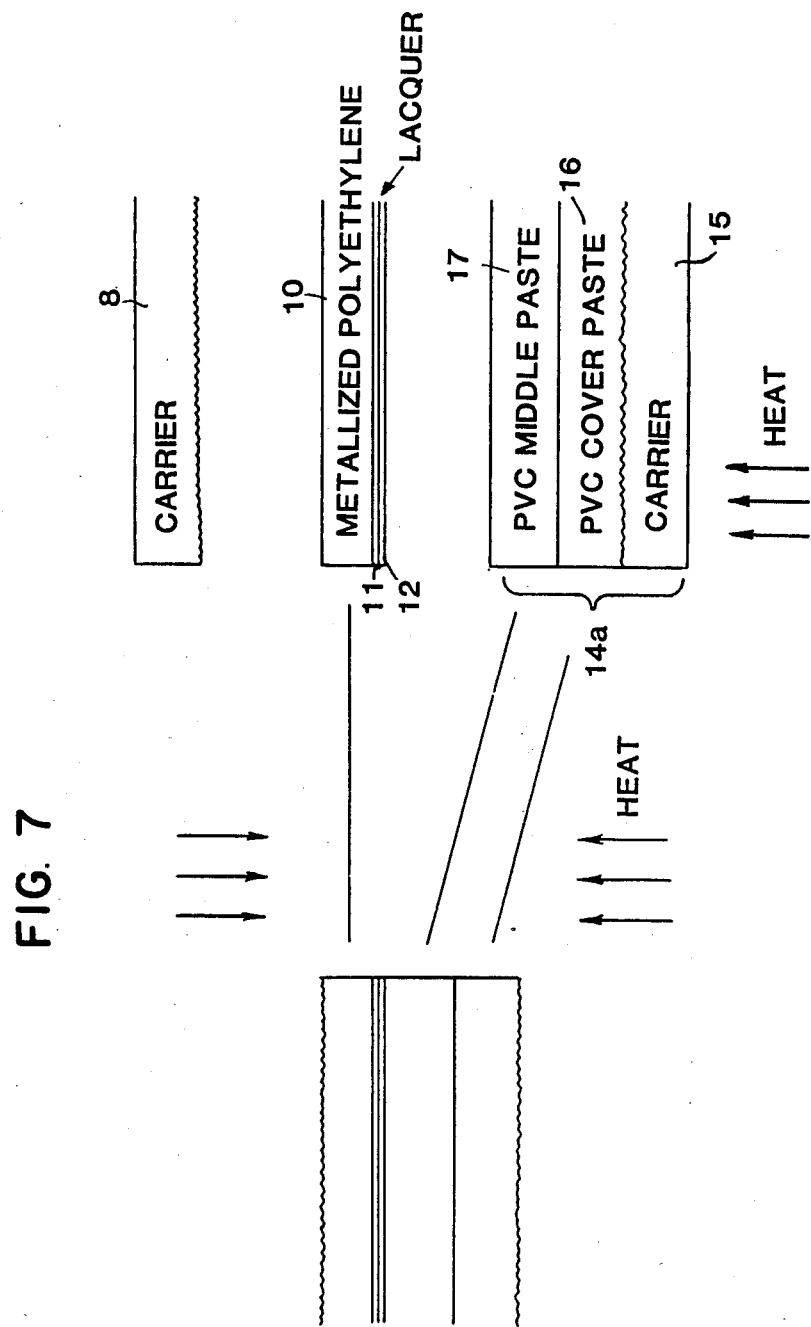

THERMAL/OPTICAL CAMOUFLAGE WITH CONTROLLED HEAT EMISSION

BACKGROUND OF THE INVENTION

This invention relates to a thermal and optical camouflage comprising a sheet material which is provided with a camouflage-coloured surface and which provides means for controlling heat emission to more certainly screen heat radiating machines and other objects by creating thermal emission patterns similar to that of the nature of the locale.

Leaf-cut camouflage material provided with slits as described, for example, in U.S. Pat. No. 3,069,796, have been in use for a long time as ultraviolet, visual and near IR camouflage. It is usually fixed to a supporting net. Swedish camouflage nets are generally garnished with equal pieces of material which are stretched into hexagons being about 40 cm across and laid side by side, and glued on. In other designs there are used more irregular variously coloured figures which are fastened to the net by means of clamps and the like. The garnishing material is normally of matte-surfaced polyvinyl chloride film.

These camouflage nets function very well as far as ultaviolet, visual and near IR camouflage is concerned because the outlines of covered objects are disguised and a picture is obtained which differs very little from the natural environment provided that the colour scheme tolerably harmonizes with what exists in the nature where they are to be used. Thus, there are manufactured, for example, special nets for woodland natural environment, for desert natural environment and for snow natural environment, which of course have considerably different colour schemes.

However, these camouflage nets do not camouflage particularly well against reconnaissance with instruments having detectors for infrared radiation in the thermal ranges 3 to 5 $\mu$m and 8 to 14 $\mu$m. For such radiation the known camouflage nets mentioned have far too poor camouflage properties since they appear as surfaces having even temperature and emit infrared radiation entirely determined by their temperature. This in turn is greatly determined by the temperature of underlying objects and meteorological conditions such as solar warming.

It is an object of the invention to provide a camouflage material having improved camouflage effect in the above-mentioned thermal infrared wavelength ranges, and which in the UV-visible and photographic IR-wavelength ranges has as good a camouflage property as the above-mentioned known ones.

This purpose is attained according to the invention by the fact that in the camouflage material there is included coloured plastics on both sides of a reflecting metal layer, the plastics including, at least partially, polyethylene or polypropylene or other polymer which is highly transparent to thermal infrared waves and therefore amenable to controllable emissivity.

The reflecting layer in the camouflage material has a result that the side of the camouflage which is visible from the outside with respect to radiation will be insulated from the camouflaged objects so that the equilibrium of radiation will be of greater similarity to the natural environment and the always cold sky. Because certain portions of the surfaces contain polyethylene or other thermal infrared transparent polymer there is also obtainable temperature contrasts over the exposed surface of the camouflage material because polyethylene together with the underlying low emissivity metal surface can present a particularly low thermal emission factor. In an infrared picture these portions will appear colder than they are, and therefore a thermal-picture will appear which shows a varied thermal pattern even though the temperature is uniform. It is thus desirable that portions of the surface are polyethylene and portions of other plastic material such as polyvinyl chloride which exhibits different emissivity. Polypropylene and certain other plastic materials, e.g., butyl rubber, have emissivity properties similar to those of polyethylene.

The plastic surface materials may suitably be coloured throughout with low-absorbing camouflage pigments. The surfaces should be structured matte in order to reduce specular reflectivity.

As the camouflage material is leaf-cut to only a limited extent, the camouflage material will substantially cover and be useful for thermal camouflage even if the camouflaged objects have temperatures substantially higher than that of the environment. Hot objects should however be specially insulated by blankets or mats so as not to be visible, and hot engines, generators etc. should be provided with particular temperature screenings and preferably be air-cooled, and the warmed cooling air should be carried off in a suitable manner in order to prevent the camouflage or other exposed material from being warmed. Hot air is not visible in IR pictures unless it has been allowed to warm opaque objects, since air has low emissivity.

The favourable effect of polyethylene or polypropylene or copolymers having a considerable content of either of these, an effect which is at first surprising, is associated with the same phenomenon, that is to say that material of low absorptivity has also low emissivity. This property is most pronounced in polyethylene.

According to the invention it is therefore to the purpose to mix areas of polyethylene or similar low-absorbing plastics with areas of other plastic materials, such as polyvinyl chloride, which have different emissivity characteristics in the surface of camouflage of the above-mentioned type. For this to be most useful, care should be taken to ensure that the heat radiation coming from the inside is minimized and that the radiation coming from the outside becomes more significant to the sensor, this desirable effect being accomplished by building in a reflecting metal layer. If desired, this layer may be in the form of a mosaic of electrically unconnected areas as well as thin in order to control radar reflection, also. The thermal pattern may be made up by means of continguous patches having differing emissivities.

The manufacture of the camouflage material used for the invention may be performed in different ways. One possibility is to coat a surface of blown film polyethylene with a vapour-deposited layer of metal, upon which is applied a plastisol of polyvinyl chloride or a film of such material. Care should be taken that the camouflage material has a matte surface, in order to enhance the camouflage effect.

When leaf-cut camouflage materials of the type known per se are drawn out, portions of the camouflage material will rise from its plane and form a three-dimensional structure. This is virtually done almost irreversibly because considerable care is necessary to fold up the material again into a flat material—it is necessary to turn all the parts having turned the back side up when being drawn out. In accordance with a particular embodiment of this thermal camouflage, this effect can be utilized by initially stretching the material, which results in a three-dimensional leafage which can then be pushed laterally together. A three-dimensional leafage with smaller holes, which can in fact become exceedingly small, will then be obtained. It is possible to push the material together to such an extent that the leafage formed covers a surface which is smaller than the surface covered initially by the unstretched material. A very fluffy three-dimensional structure is then obtained which has a high covering and thermal screening effect which enhances the thermal camouflage properties of the camouflage material as above described. This fluffy structure may be affixed to a supporting web by means of an adhesive or by mechanical means such as clamps or sewing.

In accordance with a particular embodiment, camouflage materials are made which are, so to say, emissivity patterned, i.e., have crazy quilt designs of differing areas of emissivity, on one or both sides. Such a pattern may be effected by selecting materials having varying emissivity; it has already been mentioned that through polyethylene an emission magnitude can be obtained which is lower than that of a black body of the same temperature. The thickness of the polyethylene layer can also be varied so that different portions have different thicknesses and thus different emissivities. To the same end, different areas of the surface may be different mattness. By pigmentation the infrared pattern can also be varied. An active pigment to increase the emissivity in the wavelength ranges of particular interest (3 to 5 and 8 to 14 μm) is carbon black.

BRIEF DESCRIPTION OF THE DRAWINGS

The invention is described with reference to the accompanying drawings, in which:

FIG. 1 shows a leaf-cut camouflage of a known form.

FIG. 2 shows a leaf-cut camouflage as the leaf elements are in the process of being fully deployed.

FIG. 3 is a schematic cross-sectional illustration of a camouflage according to the invention.

FIG. 4 illustrates diagrammatically a method for manufacture of a laminated camouflage material according to one aspect of the invention.

FIG. 7 schematically illustrates still another embodiment of the invention.

DESCRIPTION OF EXAMPLES EMBODYING THE BEST MODE OF THE INVENTION

Figure 5:
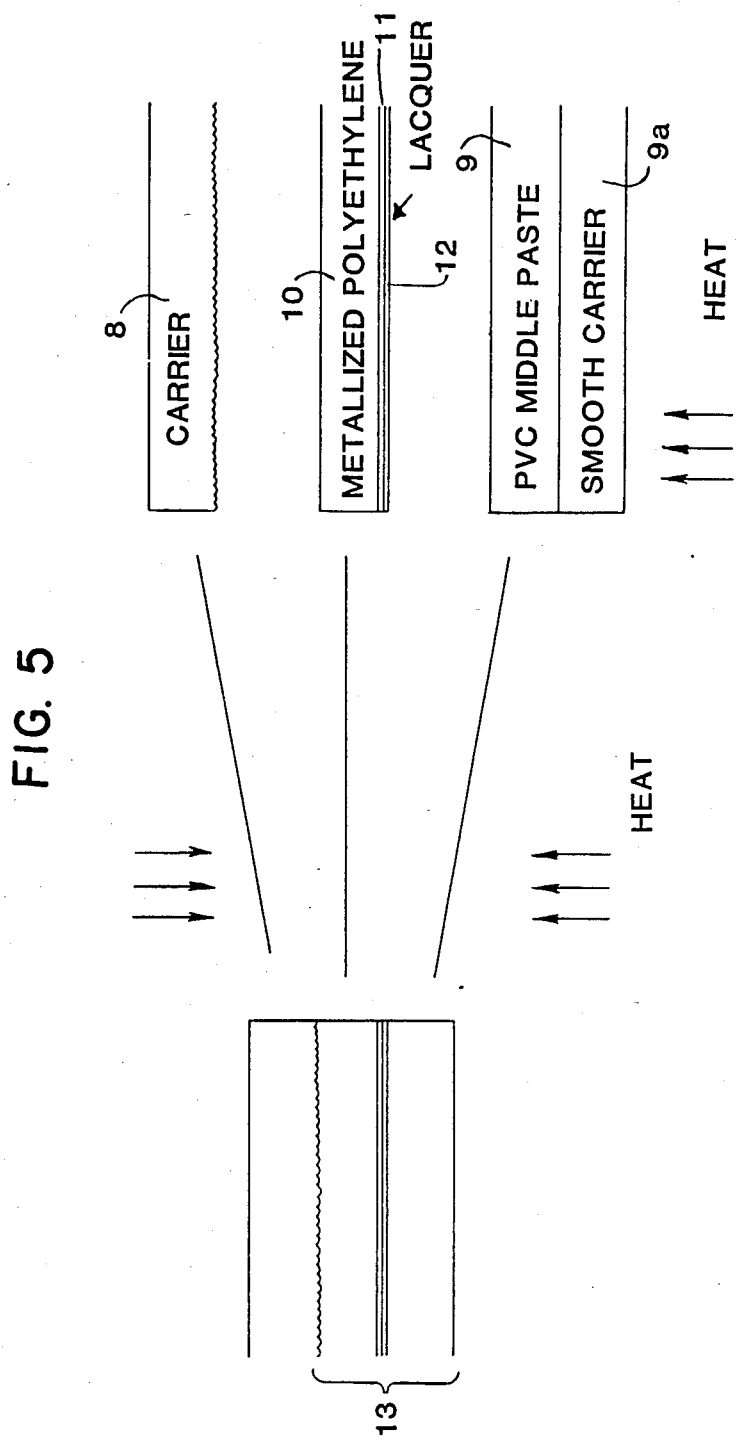
FIG. 5 schematically illustrates another embodiment of the invention.

As is seen from FIGS. 1 and 2, a camouflage material may be incised as in FIG. 1, so-called leaf-cut, and then be drawn out into a three-dimensional structure wherein each leaf will be partly turned up and back. In FIG. 2 the pulling-out has only begun in contemplating the drawing one will realize that the parts pointing outwardly will soon turn, and, when the pulling-out has exceeded a certain limit, that the structure shown in FIG. 1 cannot be obtained again merely by folding up. Pushing together then gives instead a complex three-dimensional leafage which is practically impossible to reproduce in a drawing.

Advantageously, there is used for such a thermal camouflage a material in which is contained a reflecting metal layer covered on both sides with a camouflage-coloured plastic material partly including polyethylene or other polymer capable of low emissivity and, in accordance with an important aspect of the invention, partly comprising a plastic material having a different emissivity. FIG. 3 shows schematically (and on enlarged scale for clarity) an example of a camouflage material to which the instant invention is applicable. This type of material is shown in detail in the co-pending application of Lars Gustav Karlsson, Ser. No. 568,606, now U.S. Pat. No. 4,529,633, filed Jan. 6, 1984. This is a double-sided camouflage material where 1 is a polyethylene layer, 2 is a reflecting aluminum layer, 3 is a layer of glue, 4 is a fabric base, 3' a layer of glue, 2' a reflecting metallic layer and 1' a layer of polyethylene. In this camouflage material the respective sides outwardly from the fabric base are identical, but the layers 1 and 1' can have different colors in the optical spectral region. Another method, this in accordance with the instant invention, however, and to provide a very useful measure of control of the thermal camouflage characteristics, is that layer 1' is composed of a plastic material, for example, polyvinyl chloride, having an emissivity differing from that of layer 1, in this example, polyethylene. This provides a choice, making it possible to more closely simulate the thermal emission characteristics of a particular surrounding terrain by exposing one or the other of the two surfaces.

In another aspect of the invention, the thermal factor of camouflage is controllable by providing in the same exposed surface a diversity of emissivities. A patchwork quilt or mosaic pattern based upon such a diversity of emissivities tends to frustrate the emergence of a heat pattern that would disclose to a noticeable extent a hot object which the camouflage is intended to hide. One approach to the provision of such a surface is to take advantage of the fact that differing thicknesses of polyethylene exhibit differing emissivities. Thus, to the diagrammatically illustrated hot-laminating machine 8 (FIG. 4) are fed a supporting fabric base 4, a glue film layer 3, a film 6 of polyethylene provided on the back side with a reflecting metallic layer, not shown, and a master matte design transfer carrier 7. In accordance with the invention, loose patches 5 of polyethylene are laid upon the film 6 so that in the laminator 8 they will adhere to the film material. The master matting carrier 7 is pulled off in an operation subsequent to lamination, its matte structure being reproduced in the surface of the polyethylene. The increased thicknesses of polyethylene in the area of the patches will exhibit correspondingly increased emissivities as compared with the areas of the polyethylene layer 6 between the patches.

Instead of the polyethylene patches 5, or in addition to them, patches of other plastic materials which exhibit a diversity of emissivities may be incorporated in the laminate to provide the desired mosaic emissivity pattern.

Figure 6:
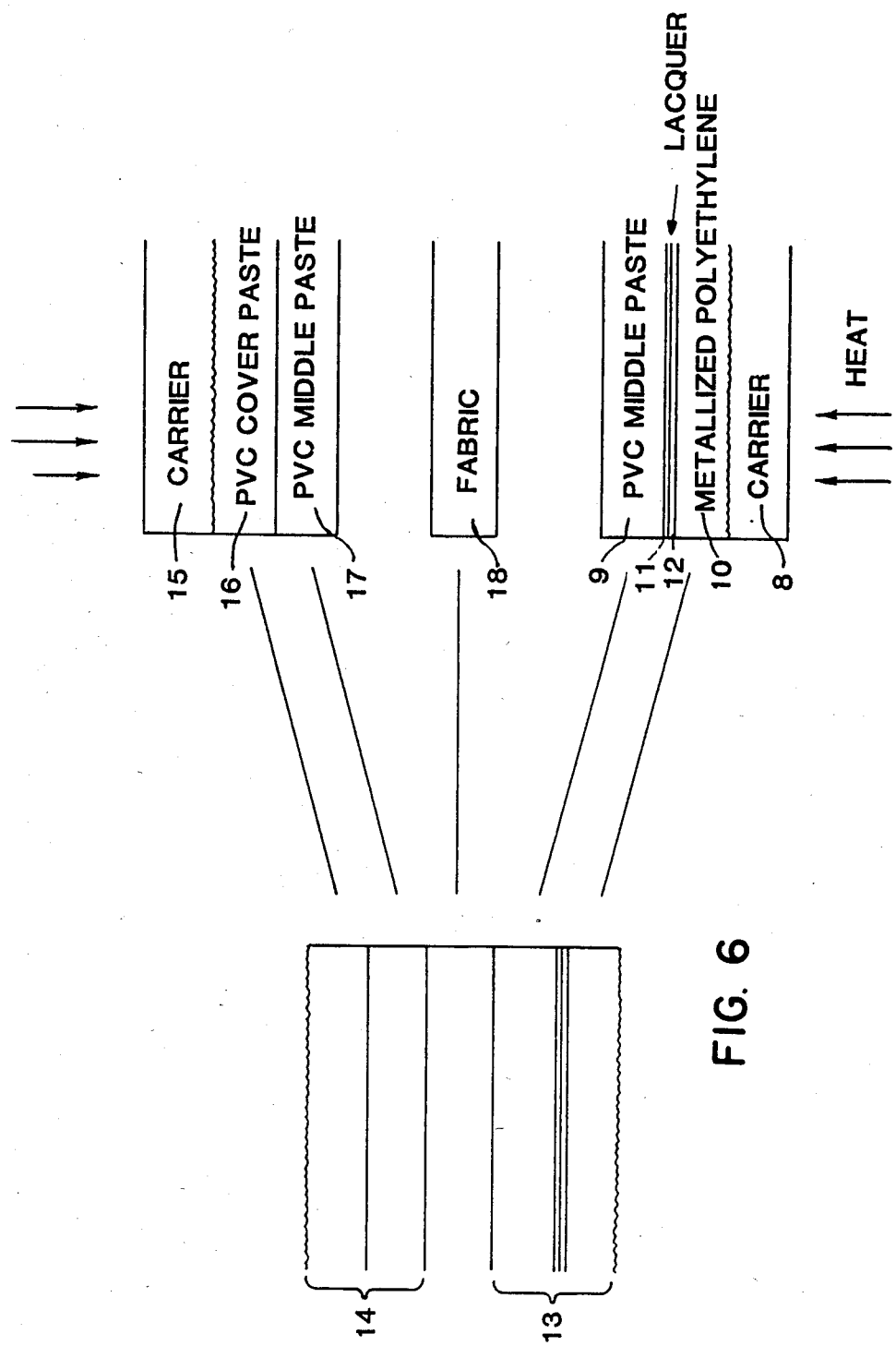
FIG. 6 schematically illustrates yet another embodiment of the invention.

A method for making an example of the camouflage material of the invention is diagrammatically illustrated in FIGS. 5 and 6. The particular product has one surface of polyethylene and the other surface is polyvinyl chloride. Both exposed layers of the camouflage material are usually coloured to provide visual camouflage and preferably are provided with matte surfaces to avoid specular reflection.

A master transfer release band 8 having the desired matte surface may be prepared in accordance with the method of the co-pending application of Erik W. Wallin, Ser. No. 568,578, filed Jan. 6, 1984, and now abandoned. A layer 9 of polyvinyl chloride is also provided by applying a polyvinyl chloride plastisol to a smooth release band 9a and curing the polyvinyl chloride with heat. A film 10 of polyethylene, metalized on one surface and having the metal 11 coated with a lacquer 12 (which serves as a glue in the laminator) is also provided. The release band 8, metalized and lacquered polyethylene film 10 and polyvinyl chloride layer 9 with release band 9a may be provided in rolls. These materials are arranged as shown in FIG. 5 and fed into a laminating machine after which the release bands are drawn away from the respective surfaces of the resulting laminate 13.

Another laminate 14 (see FIG. 6) was produced by coating the matte surface of master transfer release band 15 with a layer 16 of polyvinyl chloride plastisol, curing this layer, overcoating cured layer 16 with another layer 17 of polyvinyl chloride plastisol and curing and laminating this assembly. The laminates 13 and 14 so provided are then arranged as shown in FIG. 6 on the respective sides of a supporting open-woven fabric or scrim web 18 and this array was fed into a laminating machine. After the release bands 8 and 15 have been pulled off from the matte surfaces that they embossed, the camouflage material of the invention having respective surfaces of polyethylene and polyvinyl chloride resulted. The laminate was held together by polyvinyl chloride flowing into the multiplicity of pores or openings in the supporting web 18 in the course of lamination. If a tightly woven fabric is employed, the woven material should be primed with polyvinyl chloride plastisol to ensure adhesion of the parts of the finished laminate.

An alternative form of the camouflage material, which is lighter in weight and less costly, and method of manufacture are illustrated in FIG. 7. The elements 15, 16 and 17, making up the sub-laminate 14a, is provided in the manner described above. This array, along with the metalized and lacquered polyethylene film 10 and release band 8, are fed into a laminating machine to produce the camouflage material with matte surfaces of polyethylene and polyvinyl chloride exposed after the release bands 8 and 15 have been drawn away.

This invention provides a means for controlling the emissivity characteristics of camouflage material, making available camouflage means for more completely hiding from infrared surveillance warm or hot objects of all kinds. The described camouflage material may be used alone or with additional and enhancing camouflaging means. For example, the thermal camouflage material fully described in the co-pending application of Lars Gustav Karlsson, Ser. No. 568,606, now U.S. Pat. No. 4,529,633, filed Jan. 6, 1984, may be employed along with the thermal camouflage material described herein to meet the exigencies of particularly difficult thermal camouflage situations.

While this invention is especially directed to a novel approach to thermal camouflaging, it will be understood that it also encompasses camouflage dealing with visual and with radar broad band protection. The combination of the metallic surface in mosaic form and with the addition of conductive elements in the form of carbon or steel fibers in the supporting web or otherwise incorporated in the camouflage material gives a broadband radar protection.

I claim:

1. Camouflage material in a sheet form comprising a reflecting metal layer covered on both sides with layers of camouflage-coloured plastic, at least one of said plastic layers comprising a plastic material which is highly transparent to thermal infrared waves and which together with said reflecting layer has a given emissivity, characterized in that a surface of said camouflage material includes a second plastic layer body having together with said reflecting layer an emissivity differing from that of said give emissivity.

2. Camouflage material in accordance with claim 1 wherein said second plastic layer body consists of the same highly transparent plastic material as said one of said plastic layers, said second plastic layer body differing in thickness from the general thickness of said one of said plastic layers and therefore exhibiting a differing emissivity.

3. Camouflage material in accordance with claim 1 wherein said second plastic layer body comprises patches of said highly transparent plastic material distributed in mutually spaced relation throughout and bonded to said one of said plastic layers.

4. Camouflage material in accordance with claim 1 wherein said layer of plastic material other than said one of said plastic comprises another plastic material having together with said reflecting layer an emissivity other than said given emissivity.

5. Camouflage material in accordance with claim 4 wherein said another plastic material is polyvinyl chloride.

6. Camouflage material in accordance with claim 1 wherein said highly transparent plastic material is polyethylene.

7. Camouflage material in accordance with claim 1 wherein said reflecting metal layer is in the form of a mosaic comprising a multiplicity of electrically unconnected areas.

8. Camouflage material in sheet form comprising a reflecting metal layer and a layer of plastic overlying said metal layer, said layer of plastic comprising a patchwork comprised of different plastic materials exhibiting together with said reflecting metal layer differing emissivities and presenting a mosaic of diverse emissivities to the atmosphere.

9. Camouflage material in accordance with claim 8 and including a second layer of plastic overlying said reflecting metal layer on the opposite side thereof from said first-mentioned layer of plastic, said second layer of plastic also comprising a patchwork comprised of different plastic materials exhibiting differing emissivities, said plastic materials of said second layer collectively presenting a mosaic of diverse emissivities differing from that collectively presented by said first-mentioned layer of plastic.

10. The method of making an improved thermal camouflage material which comprises the steps of leaf-cutting the sheet form camouflage material of claim 1, stretching said leaf-cut material to form a three-dimensional leafage structure, and thereafter pushing said leafage structure laterally inwardly to thicken and densify said structure whereby to form a fluffy material with enhanced thermal camouflage properties.

11. The method of claim 10 wherein said fluffy material is affixed to a supporting web.

12. The method of claim 11 wherein said fluffy material is affixed to a supporting web by means of an adhesive.

13. The method of claim 11 wherein said fluffy material is affixed to a supporting web by means of mechanical fastening means.

14. Camouflage material in accordance with claim 2 wherein said second plastic layer body consists of polyethylene and differs in thickness from the general thickness of said one of said plastic layers and therefore exhibits different emissivity.

15. Camouflage material in accordance with claim 6 and including patches of plastic material other than polyethylene and exhibiting emissivity other than said given emissivity, said patches being distributed in mutually spaced relation throughout said one of said plastic layers.

16. Camouflage material in accordance with claim 1 wherein said highly transparent plastic material is polypropylene.

17. Camouflage material in accordance with claim 16 wherein said second plastic layer body consists of polypropylene and differs in general thickness from the thickness of said one of said plastic layers and therefore exhibits different emissivity.

18. Camouflage material in accordance with claim 4 wherein said material is leaf-cut and drawn out to form portions extending outwardly from the general plane of said material, said portions being curled to the extent that they expose their back sides.

19. Camouflage material in a sheet form comprising a reflecting metal layer covered on at least one side with a layer of camouflage-coloured plastic, said plastic layer comprising a plastic material which is highly transparent to thermal infrared waves and which together with said reflecting layer has a given emissivity, characterized in that said plastic layer includes a second layer of plastic material having together with said reflecting layer an emissivity differing from that of said given emissivity.

* * * * *